United States Patent Office

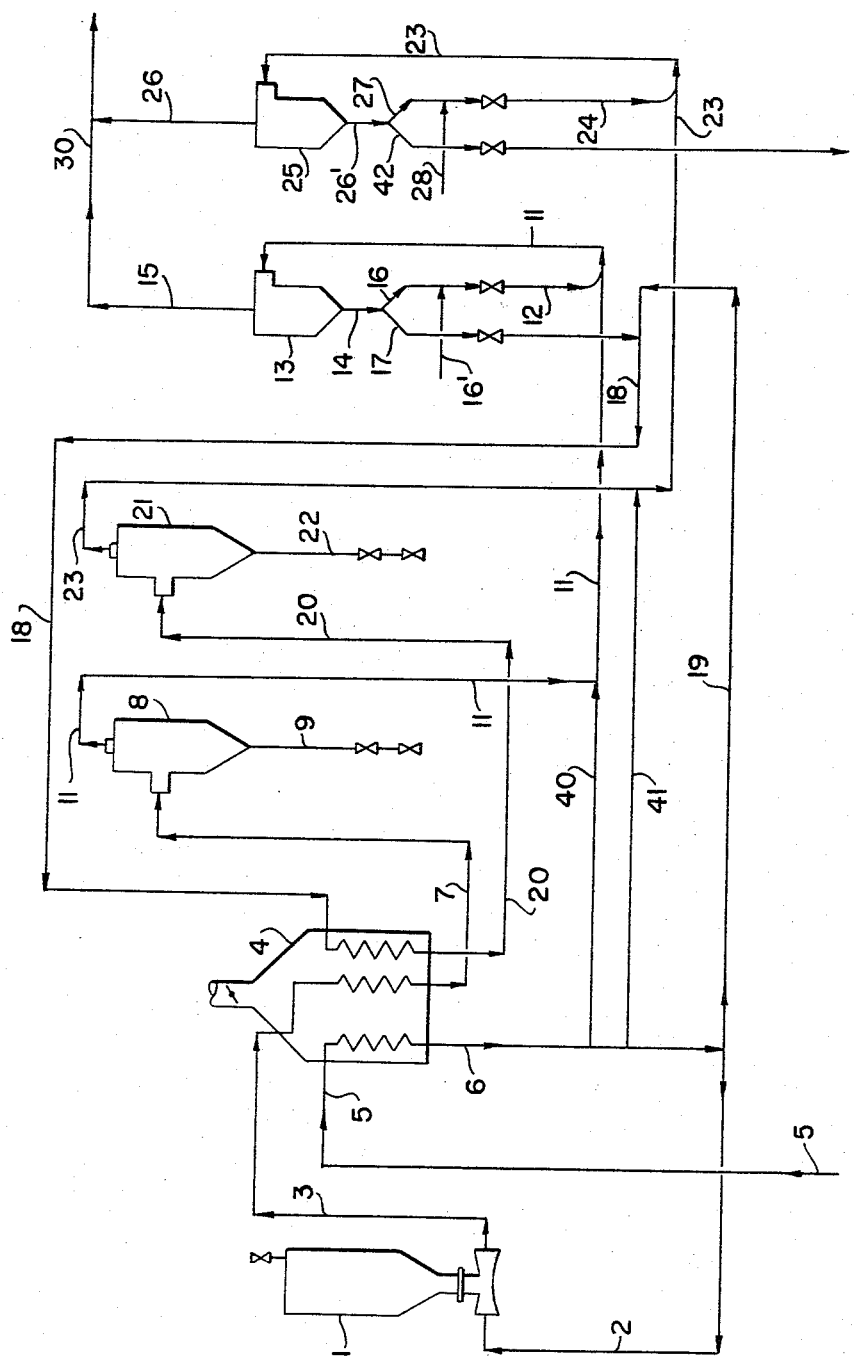
INVENTORS
RAMON OLIU
WALTER F. READ

3,330,863
Patented July 11, 1967

3,330,863
PROCESS FOR THE PURIFICATION OF SUB-
LIMABLE AROMATIC POLYCARBOXYLIC
ACIDS
Walter F. Read, Madison, and Ramon Oliu, Old Bridge,
N.J., assignors to Mobil Oil Corporation, a corporation of New York
Filed Apr. 17, 1964, Ser. No. 360,658
6 Claims. (Cl. 260—525)

The invention relates to an improved method for purification of sublimable polycarboxylic aromatic acids and, more particularly, such acids containing impurities more volatile than the acids. Although the invention is useful for purifying such acids, examples of which include trimesic acid, trimellitic acid, pyromellitic acid, and other sublimable acids of the polycarboxylic aromatic type, it is particularly adapted to purification of dicarboxylic sublimable aromatic acids with terephthalic acid being a prime example thereof. Thus, the invention is described hereinafter with particular emphasis to purification of terephthalic acid.

Terephthalic acid is of interest for many purposes, and mainly because of its use in the production of fiber and film-forming polyesters for which it must be of an extremely high degree of purity. Heretofore, it has been found most practical to purify the acid by first converting it to its dimethyl ester and purifying the ester by recrystallization or by distillation. The thus purified ester could then be used as the starting material for the production of the polyester. More recently, it has been found to be advantageous to prepare polyesters directly from terephthalic acid if a convenient method of purification for the acid could be found.

Terephthalic acid can be manufactured by several processes known to those skilled in the art. Such methods include, for example, the catalytic oxidation of p-xylene with illustrative processes thereof being those disclosed in U.S. Patents 2,853,514 and 3,036,122. In such catalytic oxidations, the p-xylene is used in the form of a dilute solution (e.g., 2 to 20%, preferably 7 to 12%) in a suitable solvent such as acetic, propionic, butyric acids or a mixture of said acids. The effective catalyst is a soluble cobalt salt, as in the form of cobalt acetate, propionate or butyrate or mixtures thereof in such an amount as to correspond to 0.1 to 1.0%, preferably 0.3 to 0.6%, by weight of cobalt metal based on the weight of fatty acid solvent. As a reaction activator, a methylenic ketone such as methyl ethyl ketone, methyl n-propyl ketone, diethyl ketone, 2,4-pentanedione and 2,5-hexane dione is used with methyl ethyl ketone being a preferred activator. Concentrations of the activator are generally at least about 1%, and preferably in the range of 3 to 10%, by weight of the fatty acid solvent. For highly efficient oxidation, it is preferred to have between about 1% and about 9% of water in the reaction mixture and the best results are generally obtained when the water content is in the range of 3% to 7%.

Oxidation is effected by contacting the reaction mixture with a gas containing molecular oxygen. The reaction is allowed to proceed generally for only a few minutes and, at most, for not more than about an hour or two, being preferably terminated before all of the methyl groups of the p-xylene have been oxidized. This results not only in the efficient and rapid oxidation of the p-xylene to terephthalic acid but, also, in preserving a substantial portion of the ketone activator in the reaction mixture which, after suitable treatment, can be recycled to the oxidation reaction. The resultant terephthalic acid is isolated and to the filtered oxidation solution sufficient p-xylene, methylenic ketone activator and perhaps water are added to restore the starting composition so that it will be ready for oxidation.

The major impurities present in terephthalic acid made by the catalytic oxidation of p-xylene arise from the incomplete oxidation. A particularly troublesome byproduct is p-carboxybenzaldehyde. This material acts as a chain terminator during polyesterification and, either alone or in combination with other intermediate oxidation products, has been found to give rise to undesirable colors in the resultant polyester product. As manufactured by the catalytic oxidation of p-xylene, crude terephthalic acid usually contains 2 to 3% of p-carboxybenzaldehyde and other impurities, generally including p-toluic acid.

Although many schemes have been proposed for the purification of terephthalic acid, the principal commercial method of purification has been via the dimethyl ester. Other approaches to purification of the acid are based on filtration of its soluble salts, leaching and fractional crystallization, to mention a few. Certain organic solvents, such as ethylene glycol at temperatures above 200° C. and pyridine, dimethylformamide, dimethylsulfoxide at much lower temperatures, dissolve large quantities of terephthalic acid. But solution results from chemical interaction and the acid is not deposited from solution in substantial amounts on cooling. If the terephthalic acid is regenerated by dilution or by addition of a mineral acid, the troublesome problem of removing color-forming, nitrogen- or sulfur-containing impurities is encountered.

Many organic solvents have a large low solvent power for terephthalic acid. Thus, recrystallization of terephthalic acid from glacial acetic acid may give a fairly pure product provided the acid is in complete solution at the maximum temperature and provided the solution is cooled slowly with agitation. Since the solubility of terephthalic acid is only about 2% at 225° C., such recrystallization requires the use of special apparatus at elevated temperatures and pressures.

An adequate purification procedure for terephthalic acid necessitates the removal of metals and intermediate oxidation products from the crude terephthalic acid. In order for the terephthalic acid to be suitable for the production of polyesters, it should contain a minimum of p-carboxybenzaldehyde and other impurities. Most of these other impurities, but not p-carboxybenzaldehyde, can be reduced to sufficiently low levels by leaching the terephthalic acid with a solvent such as water or acetic acid. For example, about 90% of that impurity can be removed by high temperature leaching with acetic acid leaving about 2000–3500 parts per million unremoved. Subsequent leaching with this and/or other solvents effects only a slight further improvement.

The present invention is primarily directed to the purification of sublimable polycarboxylic aromatic acids, as aforesaid, that contain more volatile impurities and, in particular, crude terephthalic acid containing impuriites, including p-carboxylbenzaldehyde, that vaporize at a lower temperature than the acid, and which may be prepared by any of the methods known to those skilled in the art. In a particularly suitable embodiment, it is directed to removal of p-carboxybenzaldehyde from impure terephthalic acid which for the purpose of purification as embodied herein, may be the impure acid as produced from catalytic oxidation of p-xylene, or such an acid from which metal impurities and other intermediate oxidation products have been substantially reduced in concentration by methods including extensive leaching, e.g., with a lower fatty acid, or by merely washing the acid with such materials.

It is, therefore, an object of the present invention to provide an improved process for the purification of such sublimable polycarboxylic aromatic acids, and particularly, terephthalic acid. It is also an object of the present invention to reduce the amount of p-carboxybenzaldehyde present in terphthalic acid. It is a further object of the present invention to provide an improved sublimation process for the purification of terephthalic acid.

The present invention is based on the discovery that objectives such as those aforesaid can be achieved by vaporizing the sublimable acid (e.g., terphthalic acid), to be purified, and which in the case of the terephthalic acid contains p-carboxylbenzaldehyde as an impurity, in a carrier gas comprised substantially of superheated steam and then condensing the vaporized acid from its vaporous mixture with the carrier gas by intimately mixing with such a mixture solid particulate acid that is at a temperature sufficiently lower than that of the vaporous mixture and in sufficient amount so as to condense the vaporized acid, thereby providing a solid phase comprising the condensed acid, the added solid that provided the necessary direct heat exchange to condense the vaporized acid, and as a vapor phase, the more volatile impurities (including p-carboxybenzaldehyde in the case of terephthalic acid) and the carrier gas. Although a carrier gas may be used that contains other inert gases (e.g., nitrogen, carbon dioxide, etc.) in mixture with the steam, such gases when used are preferably in minor amount with the most preferred embodiments comprising use of superheated steam substantially devoid of other gases.

In further embodiment, further purification is accomplished, when necessary or desired, by revaporizing the product mixture (separated from the vaporous materials) in a superheated steam-containing carrier gas as aforedescribed, and subjecting the resulting vaporous mixture of revaporized acid and carrier gas to a condensation step in a manner similar to that also aforedescribed or, if still further purification is desired, the condensed acid can be subjected to a plurality of additional cycles, each of which comprises revaporizing in the carrier gas the solid acid (following separation from vaporous materials) from the condensation step and condensing the vaporized acid by intimately mixing sufficiently cool acid (preferably derived from the same condensation step) to affect the desired condensation. In the case of using only one such condensation cycle, the purified acid is obtained by separating the resulting solids, in the product of the condensation step, from the vaporous materials (i.e., mainly p-carboxybenzaldehyde in the case of terephthalic acid and carrier gas) whereas, in the use of a plurality of such condensation cycles, the acid of the desired purity is generally withdrawn from the last of such cycles following separation from the vaporous materials.

As is described more fully hereinafter, and in preferred embodiments of this invention utilizing a plurality of condensation cycles, the solid acid from each condensation cycle (following separation from vaporous materials) is separated into a portion that is cooled and recycled for use as the condensing medium in that step and the remainder of the solid acid is revaporized in the superheated steam-containing carrier gas and returned to the system as the vaporous feed to the subsequent condensation cycles of the multi-cycle condensation system. In such a system, the purified product from the system is a portion of the solids from the last of the condensation steps with the remainder, upon being cooled to a desired temperature for effecting the condensation, is recycled to said last of the condensation steps in the system.

For the improved purification process embodied herein, the feed to the system which is vaporized in the superheated steam is preferably impure terephthalic acid, made by catalytic oxidation of p-xylene, that is at least partially purified as, for example, by leaching or merely washing of the impure acid with a suitable solvent or wash liquid to reduce the concentration of impurities, particularly p-carboxybenzaldehyde, and other intermediate oxidation products, if present. However, the purification process can be carried out, if desired, with production of still highly purified terephthalic acid by use of the impure terephthalic acid from the catalytic oxidation of p-xylene without prior treatment for partial purification.

As aforesaid, and using impure terephthalic acid as the feed material to be purified, the process embodied herein comprises vaporizing the sublimable feed terephthalic acid in a superheated steam-containing carrier gas and, for the condensation step or steps, the sublimed terephthalic acid is condensed from its vaporous mixture with the carrier gas by intimately mixing a sufficient amount of cooled solid terephthalic acid with the vaporous mixture. In such a process, the improved purification has been found to be accomplished by vaporizing the feed terephthalic acid while suspended in the carrier gas and, for the condensation step, cooling the vaporous mixture (carrier gas plus vaporized terephthalic acid) by intimately mixing with sufficiently cool terephthalic acid to supply the necessary direct heat exchange for cooling the vaporous mixture to condense out the terephthalic acid while allowing the impurities that condense at lower temperatures than terephthalic acid to remain in vaporous form. Important advantages that have been found to result from such a system include the avoidance of operating difficulties (e.g., fusion of particles normally attendant to vaporizing terephthalic acid from fluidized beds thereof), unexpected inhibition of undesirable side reactions (e.g., anhydride formation) by use of superheated steam as the gas in which the impure terephthalic acid is vaporized while conveyed by said steam, and in the overall production of terephthalic acid of exceptionally high degree of purity.

In order to further describe the invention, reference is made to the accompanying drawing setting forth, for purposes of illustration and not limitation, an embodiment of the invention comprising a continuous process using two stages for condensation for purification of terephthalic acid.

In the drawing, there is shown hopper 1 as a source for impure terephthalic acid fed into superheated steam line 2 and into which line 2 the terephthalic acid from hopper 1 is fed to provide a suspension of the acid in the steam. The resulting mixture is maintained at a temperature (e.g., below 450° F.) to maintain the terephthalic acid in solid form while passing through conduit 3, and the acid is vaporized during passage of the mixture through furnace 4 and, in some instances, completion of the vaporization is effected in line 7. As shown, a steam line 5 passes through the furnace whereby the steam is heated to a temperature suitable for supply via line 6 of superheated steam to line 2 as well as to other locations in the system.

The vaporous mixture of acid and superheated steam passes via line 7 through cyclone separator 8 to separate out any solids, including metal impurities, that may be present for withdrawal via line 9, with the vapor mixture of vaporized acid-steam leaving the separator via line 11. In addition to the cyclone separator, the vapor mixture may be passed through suitable filter media to further remove impurities if present. In a multi-stage process, the cyclones and/or filters may be used on just the first stage vaporized material, the last stage sublimed material, the first and last stages, or on all stages.

Into line 11, additional superheated steam is introduced via line 40 and cool terephthalic acid is introduced via line 12 whereby the cool acid intimately mixes with the vapor mixture in line 11 and, in passing through line 11 to separator 13, the vaporized acid is condensed in line 11 by direct heat exchange with the cooler solid acid introduced via line 12. The mixture of solid acid and vapors passed via line 11 to separator 13 is separated in separator 13 into the solid acid phase withdrawn via line 14 and the vapor phase is withdrawn via line 15. The solids passing through line 14 are separated into a major portion that passes through line 16 into which cooling water is injected via line 16', to cool the acid to provide the cooler acid fed via line 12 into line 11. The minor portion of the solid acid from line 14 is passed via line 17 into line 18 into which superheated steam is introduced via line 19 and which conveys the acid passed via line 17 into line 18. The acid introduced into line 18 is vaporized while passing through furnace 4 with completion of the vaporization being effected in line 20 when necessary. The resulting vapor mixture of steam-vaporized acid exits from furnace 4 via line 20 and passes into cyclone separator 21.

In separator 21, any solids carried through line 20 into the separator are separated from the vapor phase, solids are withdrawn via line 22 and the vapor phase via line 23. The vapor phase may then pass through a filter as mentioned hereinbefore. Additional superheated steam is introduced into line 23 via line 41 and cool terephthalic acid is introduced via line 24 into intimate admixture with the vapor mixture passing through line 23 whereby the vaporized acid is condensed in passage through line 23 to separator 25. From line 23, the mixture of solid acid and vapors is separated into a vapor phase withdrawn via line 26 and a solid phase withdrawn via line 26'. The solids in line 26' are divided into a major portion that passes through line 27, into which cooling water is introduced via line 28, to cool the acid for feed via line 24 into line 23; and a minor portion is withdrawn via line 42 as purified terephthalic acid from the system.

The vapors, withdrawn as overhead via line 15 from separator 13 and via line 26 from separator 25 are passed into a common overhead line 30. Such vapors, mainly comprising steam and the p-carboxybenzaldehyde impurity with a small amount of terephthalic acid can be treated, as desired, for recovery of desired components thereof. In preferred embodiment, the vapors from line 30 are cooled to condense the p-carboxybenzaldehyde and terephthalic acid present therein and the resulting solids are slurried in acetic acid and returned to the catalytic oxidation of p-xylene, to oxidize the intermediate oxidation components, providing the terephthalic acid to be purified as feed to the aforesaid purification system via hopper 1. The resulting solids may also be recycled to the first stage of vaporization of the acid, if desired.

Using a system as set forth in the drawing, a typical operation in accordance with an embodiment of this invention is as follows: steam at 344° F. is passed via line 5 through furnace 4 to provide through line 6 and thence through line 2 superheated steam at 600° F. at a rate of 393 lbs./hr. and into which is introduced from hopper 1 the impure terephthalic acid feed at a rate of 365 lbs./hr., said feed, containing about 1.5 lbs. of p-carboxybenzaldehyde and 0.73 lb. of p-toluic acid as impurities, having been prepared by catalytic oxidation of p-xylene according to the method of U.S. Patent 3,036,122 and partially purified by leaching a 15% by weight solution of the acid in glacial acetic acid at 450° F. for about two hours. The resulting mixture of steam conveying the solid acid passes via line 3 to furnace 4 (at 4 p.s.i.a.) and the acid is vaporized while passing through furnace 4 to provide a vaporous mixture of steam and feed at 600° F. that passes via line 7 to cyclone separator 8. Most metal impurities and any other solids in the feed to separator 8 are separated and removed via line 9 while the vapor phase is withdrawn via line 11. Into line 11, additional superheated steam at 600° F., at a rate of 171 lbs./hr., is introduced via line 40 and solid terephthalic acid at 300° F. via line 12 at a rate of 4105 lbs./hr. Upon admixture of the cool terephthalic acid via line 12 with the vaporous mixture of steam and vaporized terephthalic acid passing through line 11 to separator 13 there passes into separator 13 a mixture comprising a vapor phase and a solid terephthalic acid phase. Via line 15 (at 2 p.s.i.a.) the vapor phase is taken overhead at a rate of about 798 lbs./hr., as a stream (at 430° F.) comprising 786 lbs. of steam, 0.71 lb. toluic acid, 1.29 lbs. of p-carboxybenzaldehyde and 10.37 lbs. of terephthalic acid. The solid phase from separator 13 is withdrawn via line 14 and diverted into a major portion (4105 lbs./hr.) into line 16 and a minor portion (355 lbs./hr.) into line 17. The solid terephthalic acid passing through line 16 is contacted, with cooling water introduced via line 16' in amount and at a temperature to cool the solid acid to a temperature of about 300° F. to provide the feed via line 12 into 13 to effect the condensation of the vaporized acid passing through line 11 to separator 13. The solid acid passed into line 17 passes into line 18 into which superheated steam at 430° F. is introduced via line 19 and in passage through furnace 4 the solid acid is vaporized while conveyed by the steam to provide in line 20 a vaporous mixture of steam and acid that passes into cyclone separator 21. In separator 21, solids (e.g., metal impurities) present in the vaporous mixture introduced via line 20 are substantially removed via line 22 and the vapor phase is taken overhead via line 23, filtered, and into which additional superheated steam at 600° F. is introduced via line 41 at 159 lbs./hr. Into line 23, there is introduced, via line 24, 3990 lbs./hr. of terephthalic acid at 300° F. Upon admixture of the cool acid from line 24, with the stream of steam carrying the vaporized acid in line 23, the acid is condensed during passage through line 23 to separator 25. From separator 25, there is withdrawn via line 26 (at 2 p.s.i.a.) an overhead vapor phase (430° F.) at a rate of 773 lbs./hr., said overhead comprising 763 lbs. steam, 0.02 lb. p-toluic acid, 0.15 lb. p-carboxybenzaldehyde and 10.08 lbs. terephthalic acid. The solid phase of terephthalic acid withdrawn from separator 25 via line 26' is diverted into a major portion (3990 lbs./hr.) for passage through line 27 into which cooling water is introduced via line 28 to cool the acid, by direct heat exchange, to 300° F., thereby providing the feed via line 24 into line 23; and a minor portion (343 lbs./hr.) comprising purified terephthalic acid containing only about 51 parts/million p-carboxybenzaldehyde is withdrawn via line 42 as the purified terephthalic acid product of the system.

In the aforesaid process, the overhead vapors taken from line 15 and line 26 into common line 30 provide in line 30 about 1572 lbs./hr. of a vaporous mixture comprising 1549 lbs. of steam, 0.72 lb. of p-toluic acid, 1.44 lbs. of p-carboxybenzaldehyde, and 20.44 lbs. terephthalic acid. Such a vaporous mixture is most conveniently quenched (e.g., with water), and the resulting solidified intermediate oxidation products, including p-carboxybenzaldehyde and terephthalic acid are slurried with acetic acid and fed to the oxidation reaction that provides the feed for the purification process embodied herein and in which reaction the p-carboxybenzaldehyde is oxidized to terephthalic acid. If desired, the solidified material can also be recycled to the first stage vaporization step.

In practice of this invention, the impure feed acid to the system need not be at any particular temperature at the time of its addition to the carrier stream of superheated steam. Thus, the feed acid can, if desired, be preheated to below its vaporization temperature or it can be at much lower temperature as, for example, at temperatures at which it is obtained from a preceding operation.

The superheated steam used in the carrier gas should be at a temperature such that it has sufficient heat content whereby, upon addition of the feed acid to the carrier stream, appreciable condensation of water does not occur. The carrier gas should, for example in the case of terephthalic acid, be at a temperature whereby, correlated with the amount and temperature of the feed acid added thereto, the temperature of the mixture is below 450° F. and preferably below 440° before entering the furnace for vaporization. Preferably, the acid is vaporized as completely as possible prior to subjecting the stream of gas carrying the vaporized acid to condensation, by the method embodied herein, and more preferably, prior to treating the stream for separation of solid matter in operations (e.g., cyclone separators) preceding the condensation step or steps.

In reference to cooling of the acid, for use in the condensation step of the process embodied herein, in operations exemplified by the continuous process shown in the drawing, any conventional means may be used. Preferred, however, is the use of cooling water for direct heat exchange with the hot solid acid to sufficiently decrease its temperature to make it suitable for its use to provide the cooling required to condense the vaporized acid upon intimate admixture of the cooled acid with the vaporized acid conveyed by the superheated steam-containing carrier gas. In the cooling of the hot acid by direct heat exchange with cooling water, it is preferable to control the amount of cooling water employed so that only enough water is added to bring the hot acid to desired temperature for use in the condensation step after the added water has been volatilized. Since the condensation step is usually carried out at 300° F., or higher (i.e., above the boiling point of water), the process is operated in a manner such that no liquid water accumulates or is substantially present in the cooled solids recycled for use in the condensation step.

For use in specific operation of a system as specifically described hereinbefore, the following Table I sets forth the dew point temperature of terephthalic acid depending on the conditions of pressure and the mole ratio of steam: terephthalic acid in the mixture of solid terephthalic acid: steam to be sublimed.

TABLE I

| Steam=Terephthalic Acid (Mole Ratio) | 1 | 2 | 5 | 10 | 20 |
|---|---|---|---|---|---|
| | Dew Point, ° F. | | | | |
| Pressure (p.s.i.a.): | | | | | |
| 2 | 642 | 626 | 598 | 576 | 554 |
| 4 | 669 | 654 | 625 | 601 | 578 |
| 6 | 686 | 669 | 639 | 616 | 592 |
| 10 | 708 | 692 | 661 | 636 | 611 |
| 14 | 723 | 705 | 675 | 649 | 625 |
| 18 | 735 | 716 | 684 | 659 | 633 |
| 22 | 742 | 726 | 694 | 668 | 643 |

Depending on the concentration of p-carboxybenzaldehyde in the terephthalic acid to be purified by the sublimation process as specifically described hereinbefore, and the extent of desired purification, the following Table II sets forth typical conditions of pressure, temperature and steam: terephthalic acid ratio (mol:mol) that can be used for the condensation of the acid from its vaporized mixture with the carrier steam (PCB=p-carboxybenzaldehyde).

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for the purification of a sublimable polycarboxylic aromatic acid containing impurities more volatile than the acid to be purified which comprises vaporizing the acid and its more volatile impurities by heating the impure acid in the presence of a carrier gas to form a vaporous mixture, condensing the vaporized acid from the vaporous mixture by the addition thereto of previously purified acid in solid form, and separating the solid condensate of purified acid from the vaporous mixture.

2. A process, as defined in claim 1, wherein a portion of the solid condensate is cooled and returned to the condensation step.

3. A process for the purification of terephthalic acid containing impurities more volatile than terephthalic acid which comprises vaporizing the acid and its more volatile impurities by heating the impure acid in the presence of a carrier gas consisting essentially of superheated steam to a temperature above the dew point of terephthalic acid in the carrier gas, condensing the vaporized terephthalic acid from the resultant vaporous mixture by the addition thereto of previously purified terephthalic acid in solid form at a temperature above 212° F., separating the solid condensate of purified terephthalic acid from the vaporous mixture, and returning a portion of the solid condensate after cooling to the condensation step.

4. A continuous process for the purification of terephthalic acid prepared by the catalytic oxidation of p-xylene and containing intermediate oxidation products as impurities which comprises continuously adding the impure acid to a stream of superheated steam, continuously vaporizing the acid and the intermediate oxidation products by heating the stream to a temperature above the dew point of terephthalic acid in the stream, continuously passing the resultant vaporous mixture through a condensation zone, continuously passing purified terephthalic acid in solid form at a temperature about 300° F. to the condensation zone and admixing the acid with the vaporous mixture therein to condense the vaporized acid from the mixture, continuously removing the condensate from the condensation zone, continuously dividing the condensate into a major portion and a minor portion, and continuously cooling the major portion of the condensate for recycle to the condensation zone.

5. A continuous process, as defined in claim 4, wherein the major portion of the condensate is cooled to about

TABLE II

| | PCB in impure Terephthalic Acid (parts/million) | | | | | | |
|---|---|---|---|---|---|---|---|
| | 3,000 | | 15,000 | | | | |
| Number of condensation stages | 2 | | 3 | | 4 | | |
| Pressure (p.s.i.a.) | 2 | 4 | 2 | 4 | 2 | 4 | 14.7 |
| Temperature, ° F. | 440 | 440 | 440 | 440 | 440 | 440 | 440 |
| | PCB Content in Terephthalic Acid Product (parts/million) | | | | | | |
| Steam:Terephthalic Acid (mole/mole): | | | | | | | |
| 4 | 450 | 1,700 | 800 | 4,000 | 200 | 1,600 | -------- |
| 8 | 130 | 460 | 130 | 680 | 25 | 195 | 6,000 |
| 12 | 62 | 220 | 45 | 250 | 8 | 61 | 3,800 |
| 20 | 24 | 85 | 11 | 70 | -------- | 13 | 750 |
| 30 | 12 | 42 | 5 | 25 | -------- | 4 | 210 |
| 40 | 7 | 23 | -------- | 12 | -------- | -------- | 87 |
| 50 | -------- | 15 | -------- | 7 | -------- | -------- | 45 |

300° F. by direct heat exchange with water, the cooling water being vaporized to steam.

6. A continuous process, as defined in claim 4, wherein the minor portion of the condensate is further purified by vaporization in a stream of steam and condensed by direct heat exchange with previously purified terephthalic acid.

References Cited

UNITED STATES PATENTS 2,923,736   2/1960   Maclean _____ 260—525

LORRAINE A. WEINBERGER, *Primary Examiner.*

SIDNEY B. WILLIAMS, JR., *Assistant Examiner.*